(12) United States Patent
Holtzapple et al.

(10) Patent No.: US 7,780,099 B2
(45) Date of Patent: Aug. 24, 2010

(54) HIGH-EFFICIENCY JET EJECTOR AND PROPULSIVE JET

(75) Inventors: Mark T. Holtzapple, College Station, TX (US); Othon Rediniotis, College Station, TX (US)

(73) Assignee: The Texas A&M University System, College Station, TX (US)

(*) Notice: Subject to any disclaimer, the term of this patent is extended or adjusted under 35 U.S.C. 154(b) by 1421 days.

(21) Appl. No.: 10/755,570

(22) Filed: Jan. 12, 2004

(65) Prior Publication Data

US 2005/0178856 A1 Aug. 18, 2005

Related U.S. Application Data

(60) Provisional application No. 60/439,851, filed on Jan. 13, 2003.

(51) Int. Cl.
 *B05B 7/06* (2006.01)
(52) U.S. Cl. .................. 239/424; 239/423; 239/558
(58) Field of Classification Search ... 239/416.4–417.3, 239/423–425.5, 558
See application file for complete search history.

(56) References Cited

U.S. PATENT DOCUMENTS

| | | | |
|---|---|---|---|
| 1,375,601 A | 4/1921 | Morize | |
| 1,839,527 A * | 1/1932 | Bates | 239/417 |
| 2,547,936 A | 4/1951 | Grow | 60/35.6 |
| 2,663,142 A | 12/1953 | Wilson | 60/39.71 |
| 2,787,120 A | 4/1957 | Leduc | 60/39.69 |
| 3,221,497 A | 12/1965 | Forbes, Jr. | 60/35.6 |
| 3,338,051 A | 8/1967 | Chamberlain et al. | 60/39.65 |

FOREIGN PATENT DOCUMENTS

| | | | | |
|---|---|---|---|---|
| DE | 612362 | 4/1935 | | 72/19 |
| DE | 637043 | 10/1936 | | 72/19 |
| DE | 738239 | 8/1943 | | 46/1 |
| FR | 522163 | 3/1921 | | |
| FR | 523427 | 4/1921 | | |
| FR | 800835 | 5/1936 | | 5/8 |
| FR | 1037907 | 5/1953 | | 6/4 |

OTHER PUBLICATIONS

Notification of Transmittal of the International Search Report and the Written Opinion of the International Searching Authority, for International Application No. PCT/US2004/000874, filed Jan. 13, 2004, Jun. 6, 2004.

\* cited by examiner

*Primary Examiner*—Christopher S Kim
(74) *Attorney, Agent, or Firm*—Conley Rose, P.C.

(57) ABSTRACT

According to one embodiment of the invention, a system for altering fluid flow includes a main body having a first fluid flowing therethrough, a plurality of conduits disposed within the main body to form a plurality of flow paths, and a nozzle directing a second fluid through the innermost conduit. The second fluid has a greater velocity than the first fluid. The second fluid successively entrains the first fluid flowing through the flow paths in such a manner that the portion of the first fluid flowing through the innermost flow path existing between the innermost conduit and its adjacent conduit is entrained first and the portion of the first fluid flowing through the outermost flow path existing between the outermost conduit and the main body is last.

22 Claims, 4 Drawing Sheets

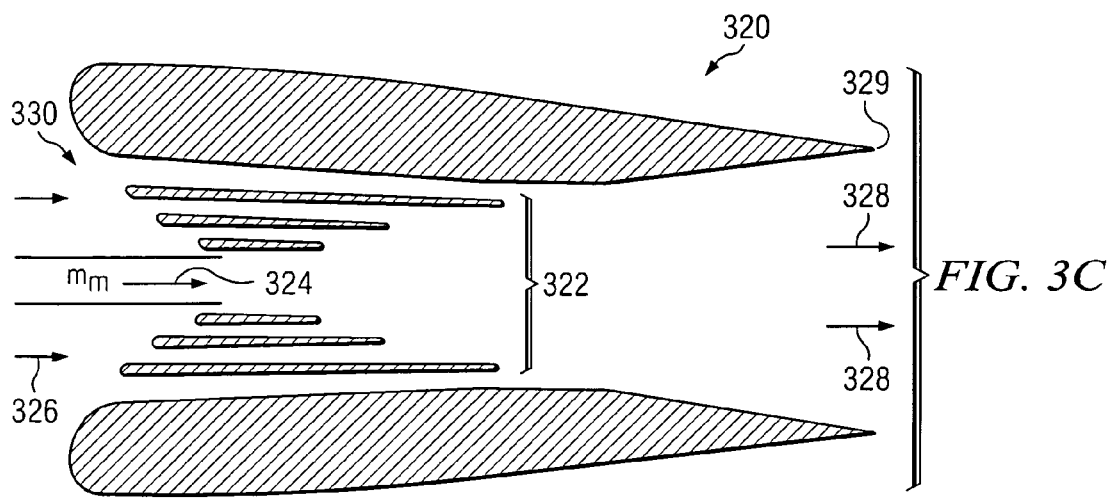
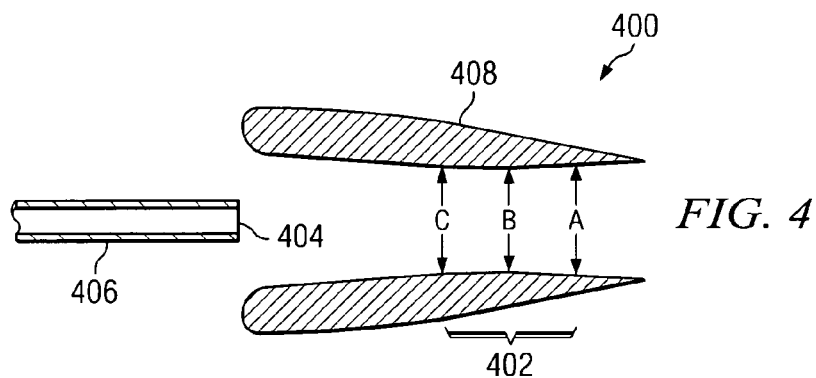
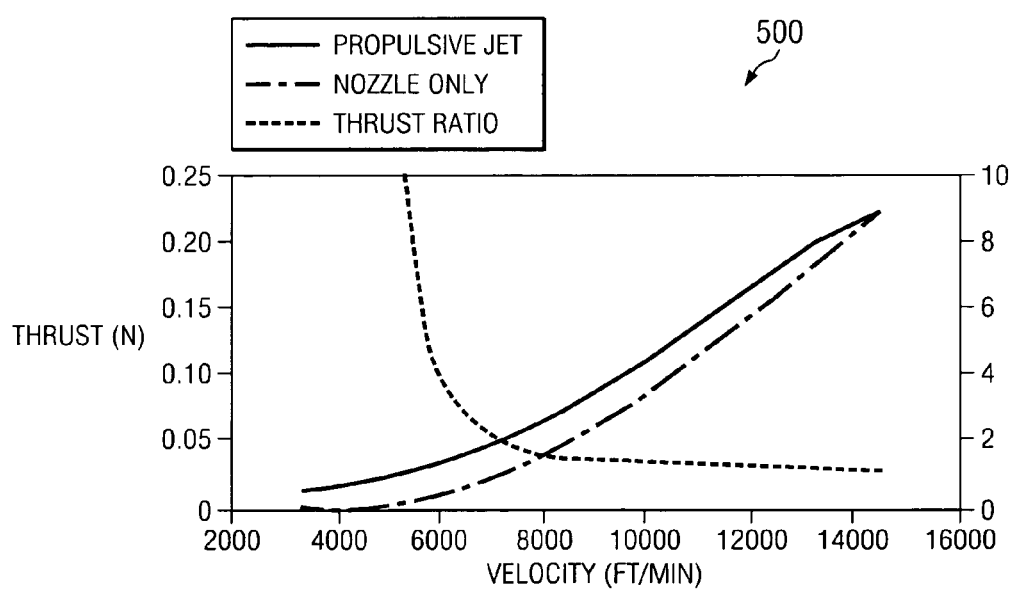

HIGH-EFFICIENCY JET EJECTOR AND PROPULSIVE JET

RELATED APPLICATIONS

This application claims the benefit of Ser. No. 60/439,851 titled "High Efficiency Evaporator and High Efficiency Jet Ejector and Propulsive Jet," filed provisionally on Jan. 13, 2003.

TECHNICAL FIELD OF THE INVENTION

The present invention relates generally to the field of fluid flow and, more particularly, to a high-efficiency jet ejector and propulsive jet.

BACKGROUND OF THE INVENTION

Energy from fluid flow is used in many applications. For example, jet ejectors, such as steam ejectors, are used as compressors in evaporators. And propulsive jets are used in applications such as jet aircraft, watercraft, missiles, and rockets. As with most mechanical apparatuses that transfer input energy to a useful output energy, efficiency is important; therefore, manufacturers of jet ejectors and propulsive jets are continually searching for more and better techniques to increase efficiency.

SUMMARY OF THE INVENTION

According to one embodiment of the invention, a system for altering fluid flow includes a main body having a first fluid flowing therethrough, a plurality of conduits disposed within the main body to form a plurality of flow paths, and a nozzle directing a second fluid through the innermost conduit. The second fluid has a greater velocity than the first fluid. The second fluid successively entrains the first fluid flowing through the flow paths in such a manner that the portion of the first fluid flowing through the innermost flow path existing between the innermost conduit and its adjacent conduit is entrained first and the portion of the first fluid flowing through the outermost flow path existing between the outermost conduit and the main body is last.

Embodiments of the invention provide a number of technical advantages. Embodiments of the invention may include all, some, or none of these advantages. A jet ejector according to an embodiment of the invention has a higher efficiency than traditional jet ejectors, because gas streams with similar velocities are mixed together. A jet ejector according to one embodiment of the invention may also be used in other heat pump applications, such as air conditioning and distillation. It may also be used as an efficient vacuum pump. A jet engine according to one embodiment of the invention may operate quieter, cooler, and more efficiently than current jet engines, which would be particularly advantageous for military and commercial applications. Tests illustrate significant thrust amplification, especially at low air velocities.

Other technical advantages are readily apparent to one skilled in the art from the following figures, descriptions and claims. Moreover, while specific advantages have been enumerated above, various embodiments may include all, some, or none of the enumerated advantages.

BRIEF DESCRIPTION OF THE DRAWINGS

For a more complete understanding of the invention, and for further features and advantages, reference is now made to the following description, taken in conjunction with the accompanying drawings, in which:

FIG. 1B is a graph of efficiency versus phi ($\phi$) for varying psi ($\psi$) for the mixing of the fluid streams of FIG. 1A illustrating that efficiency is high provided that input velocities are similar;

FIG. 3C is a schematic of a propulsive jet having tapered conduits according to one embodiment of the present invention;

FIG. 4 is a schematic of a jet ejector illustrating testing locations for the exit of a nozzle according to one embodiment of the present invention; and FIG. 5 is a graph of thrust versus velocity for a test in which a ½-inch diameter nozzle with its exit 1 inch past the jet ejector convergence was utilized according to one embodiment of the present invention.

DETAILED DESCRIPTION OF THE INVENTION

Figure 1A:
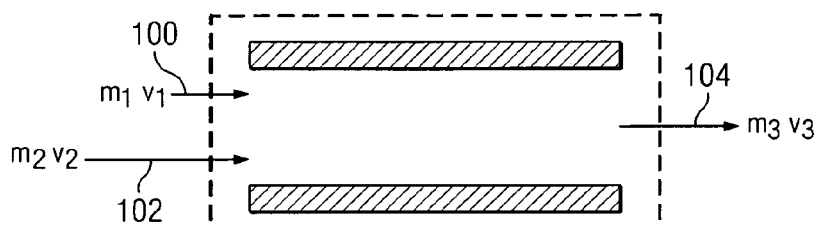
FIG. 1A is a schematic of the mixing of two fluid streams of dissimilar velocity.

FIG. 1A is a schematic of the mixing of a first fluid stream 100 and a second fluid stream 102 to create a third fluid stream 104. In the illustrated embodiment, first fluid stream 100 has a lower velocity than second fluid stream 102. First fluid stream 100 increases in velocity second fluid stream 102 decreases in velocity during the mixing. A mass balance yields:

$$m_3 = m_1 + m_2 \tag{1}$$

Assuming frictionless mixing, a momentum balance yields:

$$m_3 v_3 = m_1 v_1 + m_2 v_2 \tag{2}$$

Substituting Equation 1 into Equation 2 yields:

$$(m_1 + m_2) v_3 = m_1 v_1 + m_2 v_2 \tag{3}$$

Solving for $v_3$:

$$v_3 = \frac{m_1 v_1 + m_2 v_2}{m_1 + m_2} = \frac{m_1}{m_1 + m_2} v_1 + \frac{m_2}{m_1 + m_2} v_2 \tag{4}$$

The following dimensionless group is defined:

$$\varphi = \frac{m_2}{m_1 + m_2} \tag{5}$$

Substituting Equation 5 into Equation 4 gives:

$$v_3 = (1-\phi) v_1 + \phi v_2 \tag{6}$$

The following dimensionless group is defined:

$$\psi \equiv \frac{v_1}{v_2} \quad (7)$$

Substituting Equation 7 into Equation 6 gives:

$$v_3 = (1-\phi)\psi v_2 + \phi v_2 = [(1-\phi)\psi + \phi]v_2 \quad (8)$$

The efficiency of the mixing process illustrated by FIG. 1A is defined as follows:

$$\eta = \frac{\text{Kinetic energy added to slow stream}}{\text{Kinetic energy from fast stream}} \quad (9)$$

$$= \frac{\frac{1}{2}m_1 v_3^2 - \frac{1}{2}m_1 v_1^2}{\frac{1}{2}m_1 v_2^2 - \frac{1}{2}m_2 v_3^2} = \frac{m_1(v_3^2 - v_1^2)}{m_2(v_2^2 - v_3^2)} \quad (10)$$

The ratio $m_1/m_2$ can be expressed in terms of $\phi$:

$$\varphi = \frac{m_2}{m_1 + m_2} \quad (11)$$

$$\varphi(m_1 + m_2) = m_2$$

$$\varphi m_1 + \varphi m_2 = m_2$$

$$\varphi m_1 = m_2 - \varphi m_2 = (1 - \varphi)m_2$$

$$\frac{m_1}{m_2} = \frac{(1-\varphi)}{\varphi}$$

Substituting Equation 11 into Equation 10:

$$\eta = \frac{(1-\varphi)}{\varphi} \frac{(v_3^2 - v_1^2)}{(v_2^2 - v_3^2)} \quad (12)$$

Substituting Equation 8 into Equation 12:

$$\eta = \frac{(1-\varphi)}{\varphi} \frac{([(1-\varphi)\psi + \varphi]^2 v_2^2 - \psi^2 v_2^2)}{(v_2^2 - [(1-\varphi)\psi + \varphi]^2 v_2^2)} \quad (13)$$

$$\eta = \frac{(1-\varphi)}{\varphi} \frac{([(1-\varphi)\psi + \varphi]^2 - \psi^2)}{(1 - [(1-\varphi)\psi + \varphi]^2)}$$

Figure 1B:
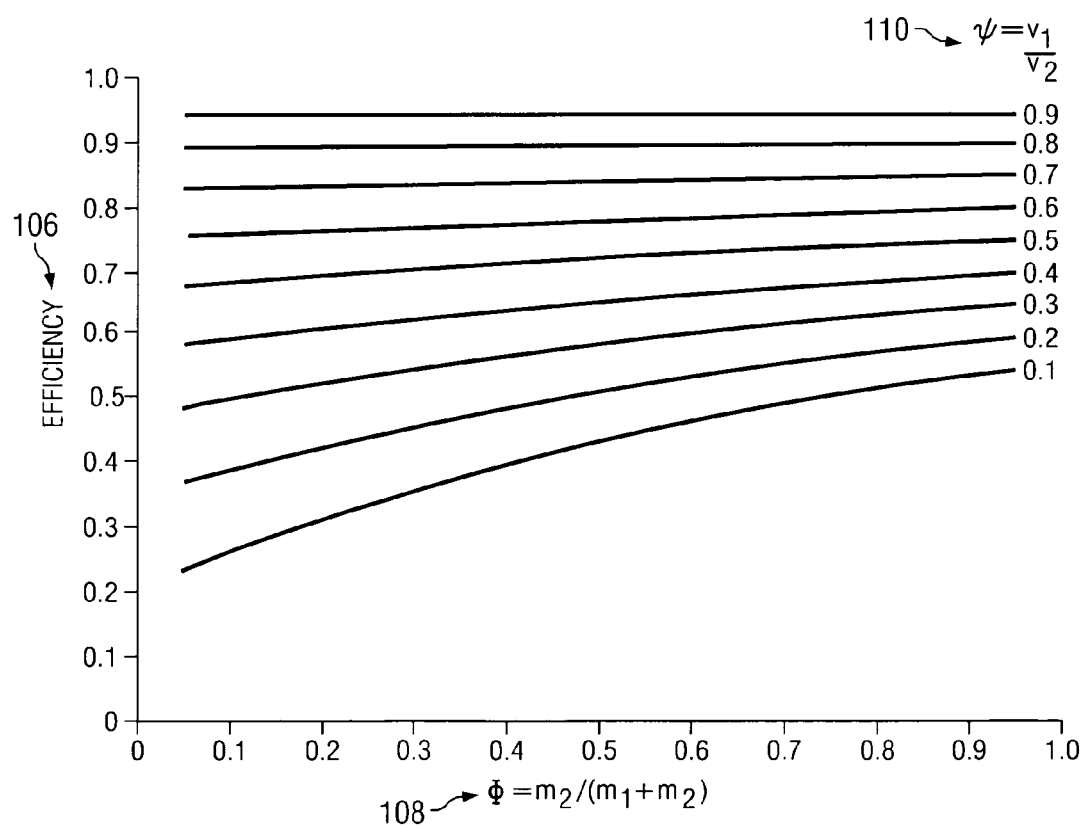

FIG. 1B is a graph of efficiency 106 versus phi ($\phi$) 108 for varying psi ($\psi$) 110 for the mixing of first and second fluid streams 100, 102 of FIG. 1A illustrating that efficiency is high provided that input velocities are similar. At high $\psi$, the efficiency is high regardless of $\phi$. At low $\psi$, the efficiency depends more strongly on $\phi$. An important point is that the efficiency is high provided the input velocities are similar. In a steam ejector application, this may be accomplished by mixing the motive steam and propelled steam in stages.

Figure 2:
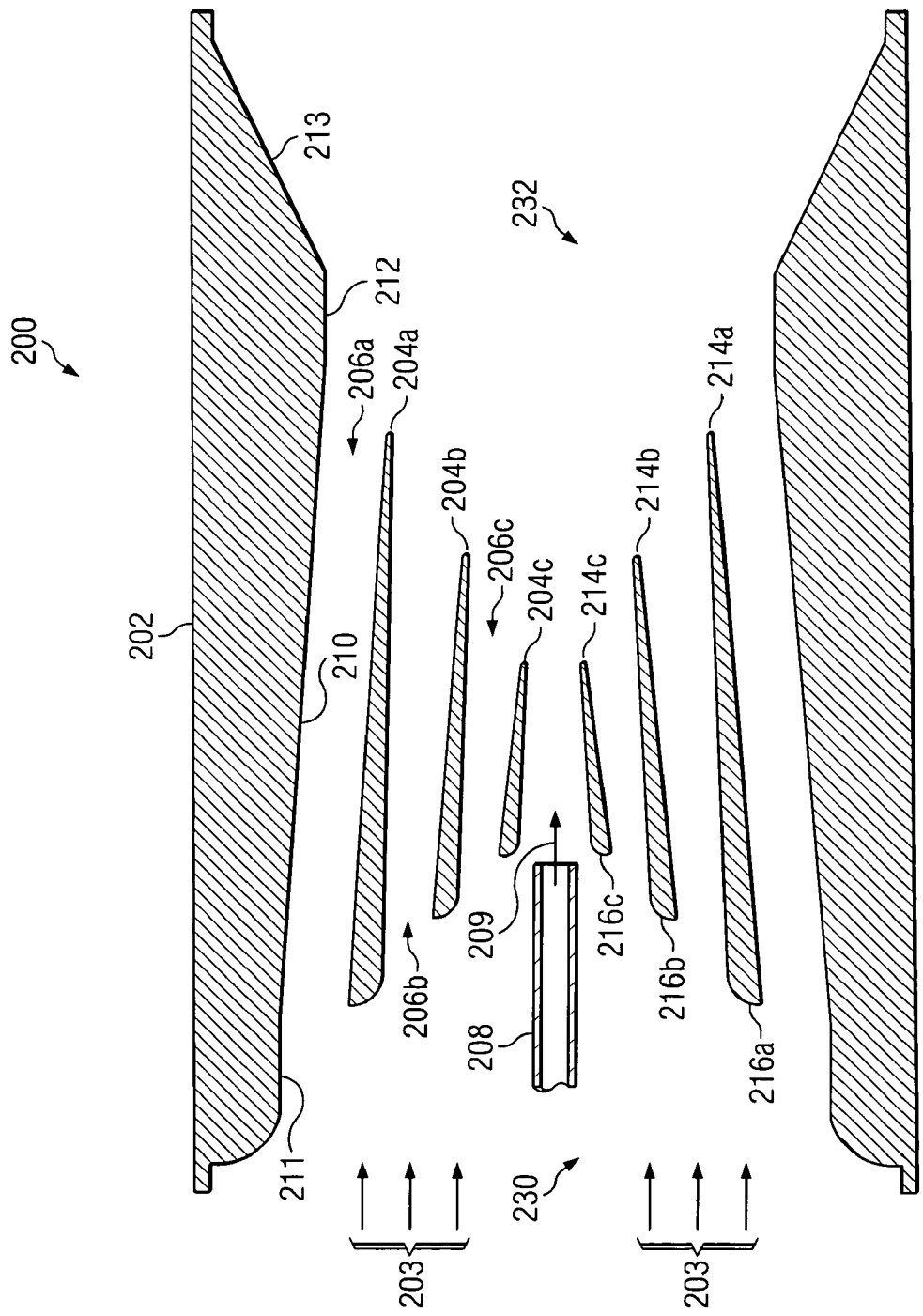
FIG. 2 is a schematic of a system for altering fluid flow according to one embodiment of the present invention.

FIG. 2 is a schematic of a system 200 for altering fluid flow in accordance with one embodiment of the present invention and utilizing the principles illustrated above in conjunction with FIGS. 1A and 1B. In the illustrated embodiment, system 200 resembles a jet ejector; however, system 200 may also be a propulsive jet or other suitable systems that mix two or more streams of fluid. For clarity of description purposes, the jet ejector illustrated in FIG. 2 is assumed to have circular elements; however, the present invention contemplates the elements having any suitable shape in any suitable size. In addition, for clarity of description purposes, the upstream end of main body 202 is indicated by reference numeral 230 and the downstream end is indicated by reference numeral 232.

In the illustrated embodiment, system 200 includes a main body 202 having a first fluid 203 flowing therethrough, a plurality of conduits 204a, 204b, 204c disposed within main body 202 to form a plurality of flow paths 206a, 206b, 206c, and a nozzle 208 directing a second fluid 209 through the innermost conduit 204c. Although first fluid 203 and second fluid 209 may have any suitable velocity, second fluid 209 has a greater velocity than first fluid 203 according to the teachings of the present invention. The second fluid 209 may be considered a motive fluid whereas first fluid 203 may be considered the propelled fluid. Depending on the application of system 200, first fluid 203 and second fluid 209 may be any suitable fluids, such as a gas, a liquid, air, water, steam, products of combustion, a solid suspended in a fluid, or any suitable combination thereof.

Main body 202, which may be formed from any suitable material, includes an inside surface 210 that, in one embodiment, resembles a venturi tube. As such, inside 210 includes a converging section 211, a throat section 212, and a diverging section 213 that may have any suitable lengths and any suitable diameters. In an embodiment where system 200 acts as a propulsive jet, an entrance 218 of main body 202 has a greater diameter than an exit 220 of main body 202. In an embodiment where system 200 acts as a jet ejector, entrance 218 may have any suitable diameter with respect to exit 220, although the inlet pressure will be less than the outlet pressure. Although the contour of the converging section 211 illustrated in FIG. 2 includes a rounded entrance followed by a straight section, it may be rounded only, straight only, or any other suitable converging geometry. The throat section 212 and diverging section 213 are illustrated in FIG. 2 as being relatively straight; however, the present invention contemplates the throat section 212 and diverging section 213 to have any suitable contour.

Conduits 204 are disposed within main body 202 and coupled to main body 202 and to each other via any suitable method. In the illustrated embodiment, conduits 204 are concentric to one another; however, conduits 204 may be nonconcentric, or in the case of non-cylindrical conduits, may have any suitable spacing. In addition, conduits 204 may have any suitable length and any suitable thickness. Assuming conduits 204 are cylindrical, flow paths 206 form annular flow paths for first fluid 203.

In one embodiment, exits 214 of conduits 204 are successively farther downstream moving from the innermost conduit 204c to the outermost conduit 204a. In other words, the exit 214c of innermost conduit 204c is further upstream from the exit 214b of conduit 204b, which in turn is further upstream than exit 214a of conduit 204a. In a particular embodiment, exit 214a of conduit 204a is proximate throat section 212 of main body 202. The positioning of exit 214a may depend on any number of factors, such as the type of first fluid 203, the type of second fluid 209, the velocities of first fluid 203 and/or second fluid 209, the lengths of conduits 204, the area of flow paths 206a, or other suitable factors.

In the illustrated embodiment, the entrances 216 of conduits 204 are successively farther downstream moving from innermost conduit 204c to the outermost conduit 204a. In other words, an entrance 216c of conduit 204c is farther upstream than entrance 216b of conduit 204b, which in turn is farther upstream than entrance 216a of conduit 204a. However, the present invention contemplates entrances 216 of conduits 204 being in any suitable position.

Nozzle 208 may be any suitable conduit that is operable to inject second fluid 209 into the innermost conduit 204c. In one embodiment, nozzle 208 injects a high-velocity, high-pressure fluid into innermost conduit 204c. In operation, second fluid 209 successively entrains first fluid 203 flowing through flow paths 206 as follows: the portion of first fluid 203 flowing through flow path 206c is entrained by second fluid 209 first, followed by the portion of first fluid 203 flowing through flow path 206b, followed by the portion of first fluid 203 flowing through flow path 206a. In this manner, second fluid 209 accelerates the fluid flowing through flow path 206c and the combination of those two fluids entrains and accelerate the fluid flowing through flow path 206b, and the combination of those fluids entrains and accelerate the fluid flowing through flow path 206a. Thus, because the fluids that are being mixed together are more closely matched in velocity, the efficiency improves, as shown to be the case above in conjunction with FIGS. 1A and 1B.

Figure 3A:
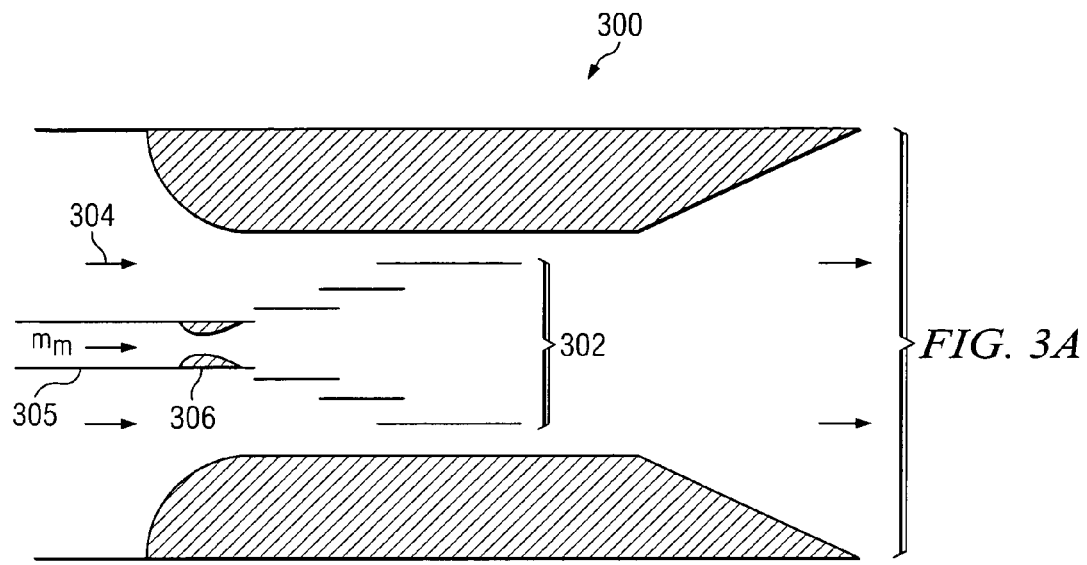
FIG. 3A is a schematic of a jet ejector having cylindrical mixing vanes according to one embodiment of the present invention.

FIG. 3A is a schematic of a jet ejector 300 in which conduits 204 represent cylindrical mixing vanes 302, each having a uniform cross-section. In this embodiment, the propelled fluid, as indicated by reference numeral 304, is accelerated to sonic velocity at the throat. Similar to the embodiment illustrated in FIG. 2, mixing vanes 302 may have any suitable length and any suitable diameter. Also illustrated in FIG. 3A is a nozzle 305 having an end 306 shaped as a venturi tube. This merely illustrates that the nozzle utilized may be any suitable nozzle operable to inject a fluid into the innermost conduit.

Figure 3B:
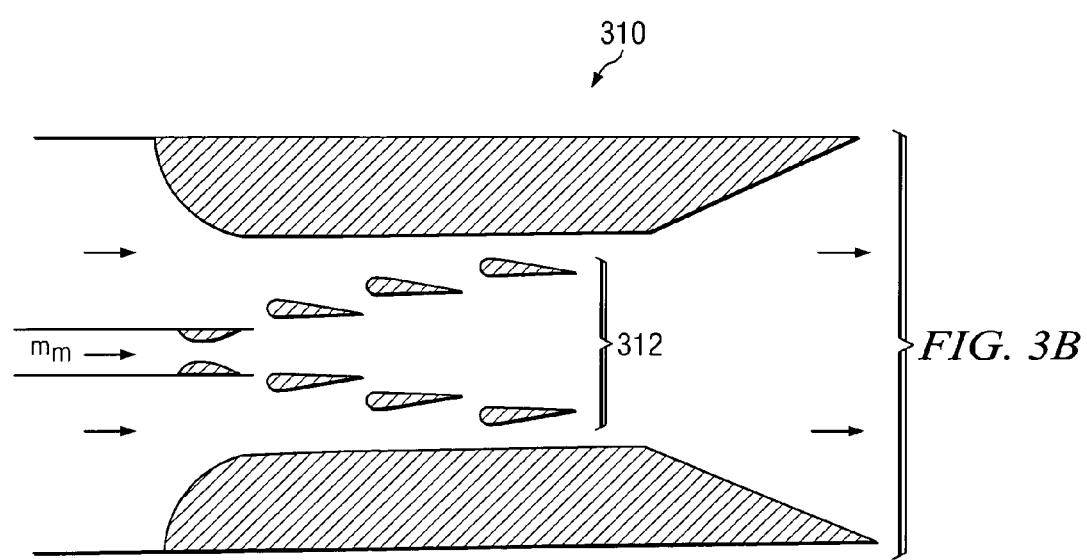
FIG. 3B is a schematic of a jet ejector having airfoil mixing vanes according to one embodiment of the present invention.

FIG. 3B is a schematic of a jet ejector 310 having airfoil mixing vanes 312 according to one embodiment of the present invention. As illustrated, airfoil mixing vanes 312 have a longitudinal cross-section that resembles an airfoil. This embodiment facilitates less turbulence and friction within the main body of jet ejector 310.

The tapered conduits 204 illustrated in FIG. 2, the mixing vanes 302 illustrated in FIG. 3A, and the airfoil mixing vanes 312 illustrated in FIG. 3B may be utilized in any suitable combination within a particular jet ejector in order to obtain the desired result of fluid flow. This may depend upon many factors, such as the velocity of the motive fluid and propelled fluid, the size and shape of the main body and conduits disposed therein, and the type of fluids utilized for the motive and propelled fluid.

FIG. 3C is a schematic of a propulsive jet 320 having tapered conduits 322 according to one embodiment of the present invention. As described above, the teachings of the present invention may be utilized in the context of a propulsive jet, which may be used to propel vehicles, such as aircraft, rockets, missiles, and ships. In one embodiment, high-velocity motive fluid, as indicated by reference numeral 324, is mixed with low-velocity inlet fluid, as indicated by reference numeral 326. The mixture, as indicated by reference numeral 328, exits at medium velocity. Because the cross-sectional area of the outlet 329 of propulsive jet 320 is less than the cross-sectional area of an inlet 330 of propulsive jet 320, the outlet velocity is higher than the inlet velocity. By conservation of momentum, there is a net forward thrust exerted on propulsive jet 320.

Motive fluid 324 may be produced by any suitable number of methods. For example, it could be the exhaust of a conventional jet engine, the exhaust of a conventional rocket, a high-velocity stream of air produced by forcing compressed air through a nozzle, or a high-velocity stream of water produced by forcing high-pressure water through a nozzle. In the illustrated embodiment, motive fluid 324 exits as slightly supersonic velocity and mixes with the sonic fluid in the innermost conduit 322. Thereafter the mixture blends with subsonic fluid from the remaining conduits 322. As in the case of the jet ejectors illustrated in FIGS. 2, 3A and 3B, propulsive jets, such as propulsive jet 320, may also utilize any suitable combination of cylindrical mixing vanes, airfoil mixing vanes, and tapered conduits.

FIG. 4 is a schematic of a propulsive jet 400 illustrating testing locations 402 for an exit 404 of a nozzle 406 according to one embodiment of the present invention. The testing of the apparatus illustrated in FIG. 4 illustrates the feasibility of the principles and embodiments discussed above in conjunction with FIGS. 1A through 3C.

In the illustrated embodiment, nozzle 406 is placed into an opening of a main body 408 which resembles a venturi tube. The sizes of nozzle 406 used in the testing were 0.5-inch diameter, 0.75-inch diameter, 1-inch diameter, and 1.5-inch diameter. Locations 402, represented by letters A, B, and C, were 1 inch after (A), at (B), and 1 inch before (C) the narrow point of the venturi's throat.

In the experimental setup (not illustrated), an air header was constructed that could use a compressed air line. This air header included a PVC tee with plugs on two of the three openings. One plug was tapped for a thermocouple adapter and another plug opposite thereof was tapped for an air line. A ¼-inch male-male adapter and a ⅜ to ¼-inch adapter were used to mount a ⅜-inch ball valve to the tee. A ¼-inch quick couple was attached through another ⅜ to ¼-inch adapter to the other end of the ball valve. The compressed air line was then connected to this quick connect.

A housing was made to hold the air header firmly centered in the main body 408. The housing had holes spaced 1 inch apart in its base that was used to align the exit 404 of nozzle 406 of the air header where the main body 408 converged (i.e., the throat), or at a point 1 inch before or 1 inch after that point (locations 402). The assembly was mounted on the sled that was attached to parallel rails by a set of linear bearings to reduce friction, and this was mounted to a wind tunnel testing section.

The measuring equipment included tubing, which was attached at exit 404 of nozzle 406 facing into the airflow and then attached to a U-tube manometer. The other side of the manometer was left open to atmosphere. A 0-200 psig pressure gauge was mounted in the PVC tee. As mentioned above, a thermocouple was mounted in one of the plugs of the PVC tee. A Fluke 5311 thermometer was used to collect the readings of the thermocouple. A Futek load cell was mounted between the sled and the table. A Transducer Techniques TM0-1 amplifier/conditioner module was used to gather readings from the load cell, which were read as voltages by a multimeter.

The load cell was suitably calibrated by mounting the load cell to a flat plate and then hanging a mass of 2058.3 g from the load cell. The load cell has a capacity of 25 pounds so the mass was converted to a fraction of the maximum load possible. The proper reading from the amplifier was determined using the maximum voltage output for the amplifier of 8 volts.

$$\text{fraction\_max\_load} = 2058.3 \text{ g} \cdot \frac{\text{lb}}{453 \text{ g}} \cdot \frac{1}{25 \text{ lb}} = 0.1817$$

$$\text{calculated\_voltage\_reading} = 0.1817 \cdot 8 \text{ } V = 1.454 \text{ } V$$

The gain pot was adjusted on the amplifier until the multimeter reading matched the calculated voltage reading. With the mass removed, the balance pot was readjusted to make the multimeter read 0 volts again. After this calibration, the amplifier would read 0 volts with no load on the load cell and 8 volts with a 25-pound load on the load cell. A line connecting these two points could be used to convert the multimeter readings to thrust.

Thrust (N)=13.864·Voltage (V)

To ensure that this equation was accurate, several other masses were measured using the load cell and compared to the graph of this equation.

With respect to testing, the ambient pressure of the laboratory was measured before each change in diameter of nozzle 406. With the ball valve closed, a compressed air hose was coupled to the air header. The ball valve was used to vary the velocity exiting the air header. Readings were taken at various air velocities for each of the three positions 402. Readings were also taken at various velocities with only the air header mounted to the sled.

The motive air density can be determined using the following equation:

$$\rho = 1.325 \frac{P + P_a}{T} \text{ where} \quad (14)$$

$\rho$ = Dry air density ($lb_m/ft^3$)

$P$ = Motive air pressure (in Hg)

$P_a$ = Ambient pressure (in Hg)

$T$ = Absolute air temperature (°R)

Once the air density is known, the measured pressure drops can be used to calculate the air velocity:

$$V = 1096.7 \sqrt{\frac{P}{\rho}} \text{ where} \quad (15)$$

$V$ = Air velocity (ft/min)

$P$ = Motive air pressure (in $H_2O$)

The thrust results were plotted versus air velocity for the various configurations used during the testing. Using least squares curve fitting, equations may be obtained to represent both nozzle only thrust and propulsive jet thrust. The thrust amplification factor is defined as the ratio of the thrust from the propulsive jet 400 (which includes both the main body 408 and nozzle 406) to the nozzle 406 only.

$$k \equiv \frac{\text{propulsive jet thrust}}{\text{nozzle only thrust}} \quad (16)$$

For each of the nozzle 406 diameters, when the exit 404 was positioned 1 inch before the throat, the propulsive jet 400 performed more poorly than the others. When the exit 404 was positioned 1 inch before the throat, the two gas streams had widely different velocities. In contrast, when the exit 404 was placed in the throat, the two gas streams had more similar velocities. This experimental result shows the importance of blending two streams of similar velocity, as predicted by FIG. 1B.

FIG. 5 illustrates a graph of thrust versus velocity for a test in which a 12-inch diameter nozzle 406 with its exit 404 1 inch past the throat. This appears to be the best performing configuration of the ones tested. The graph 500 illustrates that the amplification factor decreases as velocity increases. In one embodiment, there was at least a 30% thrust boost (i.e., k=1.3) due to the propulsive jet 400 until a velocity of just over 10,000 ft/min.

Thus, according to some embodiments of the invention, a jet ejector or propulsive jet may have higher efficiencies than traditional jet ejectors and propulsive jets because fluid streams with similar velocities are mixed together. Jet ejectors designed and built according to some embodiments of the invention may be used in other heat pump applications, such as air conditioning and distillation may also be used as an efficient vacuum pump. Propulsive jets according to some embodiments in the invention may operate quieter, cooler, and more efficiently than current propulsive jets, which is particularly advantageous for military and commercial applications. Tests as illustrated in FIGS. 4 and 5 illustrate significant thrust amplification, especially at low air velocities.

Although embodiments of the invention and their advantages are described in detail, a person skilled in the art could make various alterations, additions, and omissions without departing from the spirit and scope of the present invention.

What is claimed is:

1. A system for altering fluid flow, comprising:
   a main body configured as a conduit for a first fluid, having a first converging portion, a middle portion, and a last diverging portion, for flowing a fluid from the first portion to the last portion;
   at least one first coaxial conduit disposed within the middle portion of the main body, having an inlet portion, a middle portion, and a outlet portion, wherein the inlet portion is positioned after the first converging portion of the main body;
   at least one second coaxial conduit disposed within the first coaxial conduit, having an inlet portion, a middle portion, and an outlet portion, wherein the outlet portion of the second coaxial conduit is within the first coaxial conduit; and
   a coaxial nozzle configured to introduce a second fluid to the at least one second coaxial conduit, such that the second fluid entrains the first fluid flowing through a plurality of flow paths determined by the at least one first conduit and the at least one second conduit such that a portion of the first fluid flowing through the at least one second conduit is entrained first and a portion of the first fluid flowing through the at least one first conduit is entrained last.

2. The system of claim 1, wherein the at least one second coaxial conduit inlet is positioned inside the at least one first coaxial conduit inlet and wherein the outlet of the at least one first coaxial conduit is positioned prior to the diverging portion of the main body.

3. The system of claim 1, wherein each of the conduits has an entrance, the conduits positioned such that the entrances are successively farther downstream moving from the innermost conduit to the outermost conduit.

4. The system of claim 1, wherein the main body is configured as a venturi tube, such that the middle portion forms a throat section.

5. The system of claim 4, wherein the area of an entrance of the main body is equal to the area of an exit of the main body.

6. The system of claim 4, the outlet of the first conduit is positioned in the middle portion of the main body.

7. The system of claim 1, wherein the main body, at least one first coaxial conduit and the at least one second conduits are concentric to one another.

8. The system of claim 1, wherein the conduits are cylindrical and have a uniform cross-section.

9. The system of claim 1, wherein the at least one first coaxial conduit and the at least one second conduit comprise a cross-section that tapers from the inlet to the outlet.

10. The system of claim 1, wherein the conduits are cylindrical and have a longitudinal cross section of an airfoil.

11. A system for altering fluid flow, comprising:
a main body configured as a venturi tube having a convergence, a throat section, and a divergence, arranged in a linear fluid path for directing a first fluid sequentially therethrough;
a plurality of coaxial, concentric conduits having an inlet and an outlet disposed within the main body to form a plurality of annular passages arranged from an innermost conduit to an outermost conduit and wherein each passage is formed about the innermost conduit and has an inner wall and an outer wall, the conduits positioned such that each conduit positioned respectively outward comprises an outlet that is positioned more proximal to the divergence of the main body;
a nozzle positioned linearly adjacent to the innermost conduit, configured to provide a second fluid through the innermost conduit passage at a velocity greater than the velocity of the first fluid.

12. The system of claim 11, wherein each of the conduits has an entrance, the conduits positioned such that the entrances are successively farther downstream moving from the innermost conduit to the outermost conduit.

13. The system of claim 11, wherein the conduits have a uniform cross-section.

14. The system of claim 13, wherein the area of an entrance of the main body is equal to the area of an exit of the main body.

15. The system of claim 11, wherein the coaxial, concentric conduits have a longitudinal cross-section that tapers from the inlet to the oulet.

16. The system of claim 11, wherein the conduits have a longitudinal cross section of an airfoil.

17. The system of claim 11, wherein the first and second fluids are each selected from the group consisting of a gas, a liquid, a solid suspended in a fluid, and combinations thereof.

18. A system for altering fluid flow, comprising:
a venturi tube configured as a conduit for a first fluid, having a first converging portion, a middle portion, and a last diverging portion, for flowing a first fluid from the first portion to the last portion, having a plurality of annular, coaxial conduits disposed therein;
a nozzle having an outlet disposed within the venturi tube, wherein the outlet is positioned in the first converging portion to direct a second fluid through the center of the annular, coaxial conduits at a velocity greater than the velocity of the first fluid
such that the second fluid entrains the first fluid flowing through the annular, coaxial conduits to increase the first fluid velocity, and
create a third fluid comprising a mixture of the first and second fluids.

19. The system of claim 18, wherein the nozzle is cylindrical and has a uniform cross-section.

20. The system of claim 18, wherein the nozzle further comprises an outlet configured to produce a third fluid pressure that is at least equal to the pressure of the first fluid.

21. The system of claim 18, wherein the nozzle is cylindrical and has a longitudinal cross section of an airfoil.

22. The system of claim 18, wherein the second fluid comprises one selected from the group consisting of a gas, a liquid, a solid suspended in a fluid, and combinations thereof.

* * * * *